United States Patent
Lewis et al.

(10) Patent No.: US 7,584,936 B2
(45) Date of Patent: Sep. 8, 2009

(54) TORQUE LIMITING HAND WHEEL

(75) Inventors: Jeff Lewis, Loveland, CO (US); Stuart Muller, Rowley, MA (US)

(73) Assignee: Matheson Tri-Gas, Inc., Basking Ridge, NJ (US)

( * ) Notice: Subject to any disclaimer, the term of this patent is extended or adjusted under 35 U.S.C. 154(b) by 0 days.

(21) Appl. No.: 11/470,751

(22) Filed: Sep. 7, 2006

(65) Prior Publication Data

US 2008/0061256 A1 Mar. 13, 2008

(51) Int. Cl.
*F16K 31/44* (2006.01)
(52) U.S. Cl. .......................... 251/81; 251/77
(58) Field of Classification Search ............. 251/77, 251/79, 81
See application file for complete search history.

(56) References Cited

U.S. PATENT DOCUMENTS

| | | | |
|---|---|---|---|
| 1,075,311 A * | 10/1913 | Beck | 192/43.2 |
| 3,053,498 A | 9/1962 | Dumm | |
| 3,820,680 A | 6/1974 | Friend | |
| 3,910,308 A | 10/1975 | Mack | |
| 4,619,437 A * | 10/1986 | Williams et al. | 251/81 |
| 4,625,758 A | 12/1986 | Murray | |
| H636 H * | 6/1989 | Elliott et al. | 251/81 |
| 4,850,567 A | 7/1989 | Ambrosi | |
| 5,295,907 A | 3/1994 | Akkerman | |
| 5,395,004 A | 3/1995 | Griffin et al. | |
| 6,328,280 B1 | 12/2001 | Davidson | |
| 6,612,334 B2 | 9/2003 | Korpanty et al. | |
| 6,681,949 B2 | 1/2004 | Tibor | |

* cited by examiner

*Primary Examiner*—John K Fristoe, Jr.
(74) *Attorney, Agent, or Firm*—Townsend and Townsend and Crew LLP

(57) ABSTRACT

According to the invention, a system for applying torque to a valve element that stops fluid flow through the valve is disclosed. The system may include an input element, a drive element, and a torque transferring mechanism. The input element may be configured to receive a torque. The drive element may be configured to apply substantially none of the torque, or at least a portion of the torque, to the valve element. The torque transferring mechanism may be configured to receive the torque from the input element, and transfer substantially none of the torque, or at least a portion of the torque, to the drive element based at least in part on a resistance of the valve element to turning.

6 Claims, 2 Drawing Sheets

TORQUE LIMITING HAND WHEEL

BACKGROUND OF THE INVENTION

Fluid valves, for example those which assist in containing liquid or gases in a cylindrical tank, are often opened or closed by a user applying a torque to a handle on the valve. The torque applied by the user, and the direction in which it is applied, may open or close the valve by moving a sealing element between an open position and a closed position.

Once the sealing element has reached a substantially-closed position, additionally torque applied in the closing direction, usually clockwise, may damage the seating surface which the sealing element contacts to close the valve. Likewise, once the sealing element has reached a full-open position, additional torque applied in the opening direction, usually counter-clockwise, may damage the seating surface, seals, and/or packing elements in the valve which seal interior of the valve from the outside environment. The systems and methods of the present invention provide solutions to these and other issues.

BRIEF SUMMARY OF THE INVENTION

In one embodiment, a system for applying torque to a valve element that stops fluid flow through the valve is provided. The system may include an input element, a drive element, and a torque transferring mechanism. The input element may be configured to receive a torque. The drive element may be configured to apply substantially none of the torque, or at least a portion of the torque, to the valve element. The torque transferring mechanism may be configured to receive the torque from the input element, and transfer substantially none of the torque, or at least a portion of the torque, to the drive element based at least in part on a resistance of the valve element to turning.

In another embodiment, a system for applying torque to a valve element that stops fluid flow through the valve is provided. The system may include an input means for receiving a torque; a drive means for applying substantially none of the torque, or at least a portion of the torque, to the valve element; and a torque transferring means for transferring substantially none of the torque, or at least a portion of the torque, from the input means to the drive means based at least in part on a resistance of the valve element to turning.

In another embodiment, a method of applying torque to a valve element that stops fluid flow through the valve is provided. The method may include coupling a drive element to a valve element; receiving a torque at an input element; transferring substantially none of the torque, or at least a portion of the torque, to the drive element based at least in part on a resistance of the valve element to turning; and applying the torque received by the drive element to the valve element.

In another embodiment, a torque limiting shutoff valve for a compressed fluid container is provided. The torque limiting shutoff valve may include a handle, a torque collar, and a valve element that stops fluid flow through the valve. The handle may be turned to open or close the valve when torque is applied, and the may include one or more spring loaded pins, or a combination of a ball and spring, that are biased to move towards the center of the handle. Alternatively, the spring loaded pins (or ball and spring) may be biased to move towards the outside of the handle and be set in the torque collar. The torque collar may be in contact with tips of the spring loaded pins and the pin tips may be operable to frictionally engage and turn the torque collar in response to the turning of the handle. The pins may slip around the collar when the torque applied to the handle exceeds a first threshold torque. The valve element may be positioned through the center of the torque collar and operable to rotate in concert with the collar. Rotation of the valve element may actuate the opening or closing of the valve.

In an additional example, a series of magnets may be used to transfer torque to the torque collar. In this example, either the attracting or opposing poles of the magnets may be used to transfer the torque from the handle to the torque collar. In still additional examples, friction may be generated between complementary surfaces that are pressed together by one or more springs. The complementary surfaces may be made from frictional materials that have known coefficients of friction. The surfaces may be oriented in a plane such that they contact each other with a relatively large amount of surface area.

In further embodiments a valve position indicator may be added to give a visual and/or audible indication of the current position of the valve. The indicator may, for example, use a pin and spring arrangement driven from the valve diaphragm or packing nut that forces the pin into an "up" position upon reaching a closed position. In additional embodiments, the indicator may include an opening or window formed in the valve handle that displays an open or closed indicator when the valve element is moved to those positions.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

The present invention is described in conjunction with the appended figures.

Figure 1:
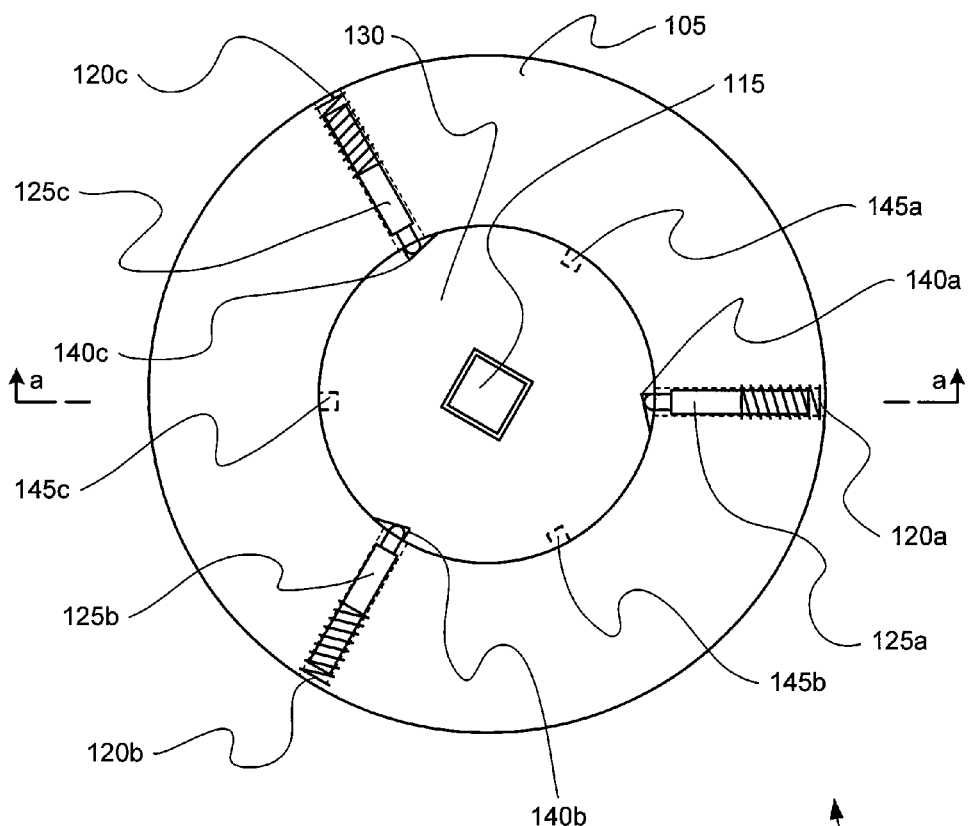
FIG. 1 shows a plan view of the top of one system of the invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

In one embodiment of the invention, a system for applying torque to a valve element is provided. The system may include an input element, a drive element, and a torque transferring mechanism. The input element may be configured to receive a torque, possibly from a user. In some embodiments, the system may further include the valve element. In an exemplary embodiment, the system may further include a tank configured to contain a fluid, where the tank is coupled with the valve element.

The drive element may be configured to apply substantially none of the torque, or at least a portion of the torque, to a valve element. The drive element may define a cavity configured to detachably couple with the valve element.

The torque transferring mechanism may be configured to receive the torque from the input element and transfer substantially none of the torque, or at least a portion of the torque, to the drive element based at least in part on a resistance of the valve element to turning. If the torque transferring mechanism transfers at least a portion of the torque to the drive element, the portion transferred may be based at least in part on the resistance of the valve element to turning.

In some embodiments, the torque transferring mechanism may include at least one force producing element and at least one force transferring element. The at least one force transferring element may be coupled with the force producing element, and may also be configured to engage the drive element. In some embodiments, the force producing element may be a spring.

In some embodiments, the drive element may define at least one cavity, and the at least one force transferring element may be configured to engage the drive element at the at least one cavity. Each cavity may be characterized by a first inclined wall. In these embodiments, the torque transferring mechanism may be configured to transfer substantially none of the torque, or at least a portion of the torque, in a first direction based at least in part on a number of factors. These factors may include the amount of force produced by the force producing element, and a slope of the first inclined wall. In some embodiments, the slope of the first inclined wall may be between about 1 percent and 30 percent. In an exemplary embodiment, the slope of the first inclined wall may be about 12 percent.

In some embodiments, each cavity may be characterized by a second inclined wall, and the torque transferring mechanism may be configured to transfer substantially none of the torque, or at least a portion of the torque, in a second direction based at least in part on a number of factors. These factors may include the amount of force produced by the force producing element, and a slope of the second inclined wall. In some embodiments, the slope of the second inclined wall may be between about 1 percent and 10 percent. In an exemplary embodiment, the slope of the first inclined wall may be about 7 percent. In another exemplary embodiment, a cam may be used to apply force to a pin and spring or ball and spring arrangement.

In some embodiments, the system may also include a locking mechanism. The locking mechanism may be configured to transfer to the drive element all torque received by the input element when the locking mechanism is activated. The locking mechanism may include a force producing element, and the input element and the drive element each have an axis of rotation where the force producing element resists movement of the input element relative to the drive element in a direction along at least one of the axes of rotation. The drive element may defines at least one cavity, and the torque transferring mechanism may include at least one force transferring element, wherein the force transferring element may engage the at least one cavity when the input element is at least moved relative to the drive element along one of the axes of rotation. In some embodiments, systems which include the locking mechanism may include a visual indicator viewable by a user when the at least one force producing element has engaged the at least one cavity.

In another embodiment, another system for applying torque to a valve element is provided. The system may include an input means for receiving a torque; a drive means for applying substantially none of the torque, or at least a portion of the torque, to a valve element; and a torque transferring means for transferring substantially none of the torque, or at least a portion of the torque, from the input means to the drive means based at least in part on a resistance of the valve element to turning. In some embodiments, the portion of the torque may also be based at least in part on the resistance of the valve element to turning.

In some embodiments, the torque transferring means may include at least one means for producing a force; and at least one force transferring means for engaging the drive means, wherein the at least one force transferring means is coupled with the at least one means for producing a force.

In some embodiments, the system may further include a means for locking the input means to the drive means. When the input means is locked to the drive means, the drive means may not move relative to the input means. The system may further include a means for indicating to a user that the input means is locked to the drive means. Any of the various components of the systems of the invention may be made from aluminum; steel; stainless steel or other alloy; a composite such as carbon fiber; ceramic; and/or a polymer or plastic. Materials of certain interacting components may be selected to increase or decrease friction, reduce wear, and/or provide the most economical construction.

In another embodiment a method of applying torque to a valve element is provided. The method may include coupling a drive element to a valve element; receiving a torque at an input element; transferring substantially none of the torque, or at least a portion of the torque, to the drive element based at least in part on a resistance of the valve element to turning; and applying the torque received by the drive element to the valve element. In some embodiments, the portion of the torque may be based at least in part on the resistance of the valve element to turning. In these or other embodiments, the method may further include locking the drive element to the input element, where, once locked, substantially all torque received at the input element is transferred to drive element. These methods may include indicating to a user that the drive element is locked to the input element.

In another embodiment, a torque limiting shutoff valve for a compressed fluid container is provided. The torque limiting shutoff valve may include a handle, a torque collar, and a valve element. The handle may be turned to open or close the valve when torque is applied, and the may include one or more spring loaded pins that are biased to move towards the center of the handle. The torque collar may be in contact with tips of the spring loaded pins, and the pin tips may be operable to frictionally engage and turn the torque collar in response to the turning of the handle. The pins may slip around the collar when the torque applied to the handle exceeds a first threshold torque. The valve element may be positioned through the center of the torque collar and operable to rotate in concert with the collar. Rotation of the valve element may actuate the opening or closing of the valve.

In some embodiments, the torque collar may have a first set of grooves that are configured to reversibly engage the tips of the spring loaded pins. The pins may engage the first set of grooves until the torque applied to the handle exceeds the first threshold torque. In these or other embodiments, the torque collar may have a second set of grooves in a different rotational plane then the first set of groves. The pins may not engage the second set of grooves until the handle is moved parallel to the handle's rotational axis to align the pins with the rotational plane of the second set of grooves. The pins may engage the second set of grooves until the torque applied to the handle exceeds a second threshold torque, where the second threshold torque is different than the first threshold torque. In some embodiments, the pins may engage the second set of grooves regardless of the torque applied to the handle. An indicia on the valve may be exposed when the handle is moved parallel to the handle's rotational axis to align the pins with the second set of grooves. The indicia may indicate that the pins are aligned with the second set of grooves.

Figure 2:
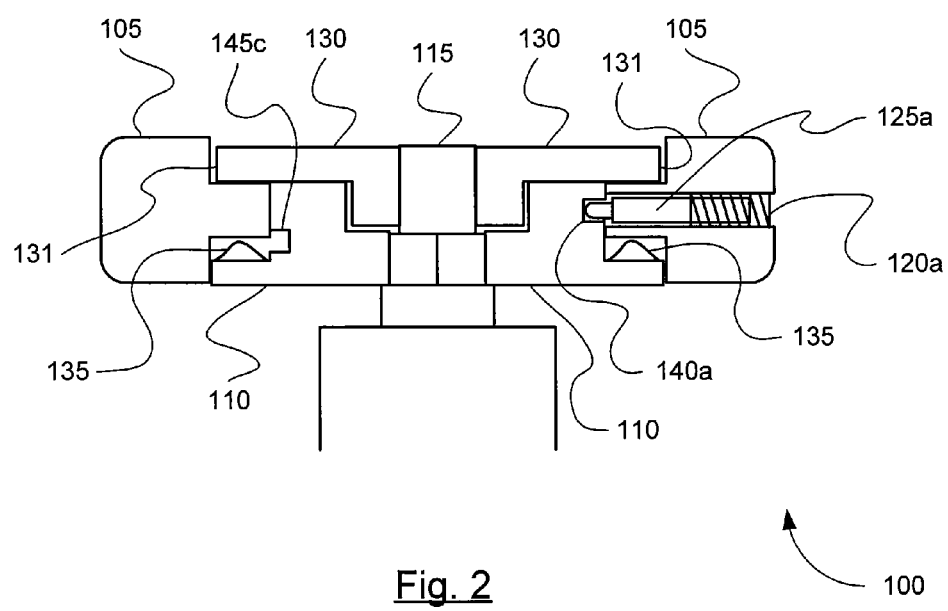
FIG. 2 shows a section view of plane a-a of FIG. 1.

Turning now to FIG. 1, a plan view of the top of one system 100 of the invention is shown. FIG. 2 shows a section view of plane a-a of system 100 from FIG. 1. System 100 includes an input element 105 (which may also be referred to as a handle); a drive element 110 (which may also be referred to as a torque collar); a valve element 115; three force producing elements 120, shown in this embodiment as springs; and three force transferring elements 125 (which may also be referred to as pins that spring loaded by force producing elements 120), shown in this embodiment as machined pins. Retainer element 130 couples input element 105 to drive element 110. A secondary force producing element 135, shown in this embodiment as a wave spring, may be disposed between input element 105 and drive element 110. System 100 may be detachably coupled with valve element 115 in some embodiments, or fixedly coupled with valve element 115 in other embodiments.

In an initial position, input element 105 may be in a position in which secondary force producing element 135 encourages input element 105 to be at a first elevation with respect to drive element 110. In this position, force transferring elements 125 may engage primary cavities 140 (which may also be referred to as a first set of grooves). When a clockwise torque is input at input element 105, possibly by a user, force transferring elements 125 engage the first wall of the primary cavities 140 which is sloped. In this position, the resistance of valve element 115 to turning, as well as the slope of the first walls of primary cavities 140 and the amount of force produced by force producing elements 120, may determine how much of the input torque is transferred to drive element 110.

For example, if the valve is in the full-open position, and a clockwise torque is applied to input element 105, force producing elements 125 may engage primary cavities 140 and friction between the first sloped walls and force producing elements 125 may cause force to be transferred from input element 105 to drive element 110, thereby transferring the applied torque. When, from such torque, the valve reaches a substantially closed position, the valve may allow some amount of tightening, so long as the resistance of the valve to further tightening can be overcome by the torque allowed to transfer from force transferring elements 125 to primary cavities 140. As the valve is tightened further and further, frictional forces between force producing elements 125 will be overcome by the applied torque, force producing elements 125 will ride out of primary cavities 140, and input element 105 will rotate relative to drive element 110.

In this manner, additional torque may not be transferred to drive element 110 once the valve is closed to a certain tightness. The maximum torque which may be required to achieve this tightness may be the maximum torque which system 100 is configured to apply (which may also be referred to as a first threshold torque). Such a configuration may be made, for example, by modifying the slope of the sloped wall of primary cavities 140, and the force produced by force producing elements 125. For example, if the maximum configured torque of system 100 is desired to be lower, the slope of the sloped wall of primary cavities 140 will be less, and/or the force produced by force producing elements 125 will be less. If the maximum configured torque of system 100 is desired to be higher, the slope of the sloped wall of primary cavities 140 will be greater, and/or the force produced by force producing elements 120 will be greater. Different amounts of maximum torque may be desired for different valve configurations or different fluids held. For example, if a fluid has a lower viscosity or density, a higher maximum torque may be desirable. Note that in the counterclockwise direction, all torque input at input element 105 will be transferred to drive element 110 because the counterclockwise directional wall of primary cavities 140 are normal to the force applied.

In some cases, a user may desire to apply more torque to the valve than the device is configured to apply in this initial position, for example, when the valve has become damaged and the only way to close the fluid connection of the valve is to apply more torque, to possible deform and better mesh the sealing element with the closed-position valve seat. In this situation, a user may have applied a maximum allowable amount of torque to the valve, and input element 105 may be rotating relative to drive element 110. To apply additional torque to the valve, the user may apply a lateral force on the input element 105 in the direction of drive element 110, and overcome and compress secondary force producing element 135, thereby moving input element 105 toward drive element 110.

In this position, input element 105 may be rotated relative to drive element 110 until force transferring elements 125 engage secondary cavities 145 (which may also be referred to as a second set of grooves). The walls of secondary cavities 145 are normal to forces applied to them, therefore in either clockwise or counterclockwise direction, all torque applied to input element 105 will be transferred to drive element 110. The side 131 of retainer element 130 may visually indicate to a user that input element 105 is locked to drive element 110 in this position. Side 131 may be colored, for example, bright red, or made to otherwise stand out visually to a user. This may inform a user or subsequent viewer of system 100 that torque in excess of the preconfigured maximum may have been applied to the valve. This may indicate to a viewer of system 100 that the valve is damaged or otherwise in need of maintenance.

In some embodiments, once secondary force producing element is overcome and compressed by the lateral force applied by the user, the pins may engage a shoulder on drive element 110, limiting the ability of input element 105 to return to the initial position. In these or other embodiments, secondary cavities 145 may have walls that are either normal to the forces applied by force transferring elements 125, or are sloped as primary cavities 140 to allow for maximum allowable torques in either direction of rotation. Any number of additional shoulders can also be present in other embodiments allowing different maximum torques in either rotational direction via cavities at each available shoulder engagement.

Figure 3:
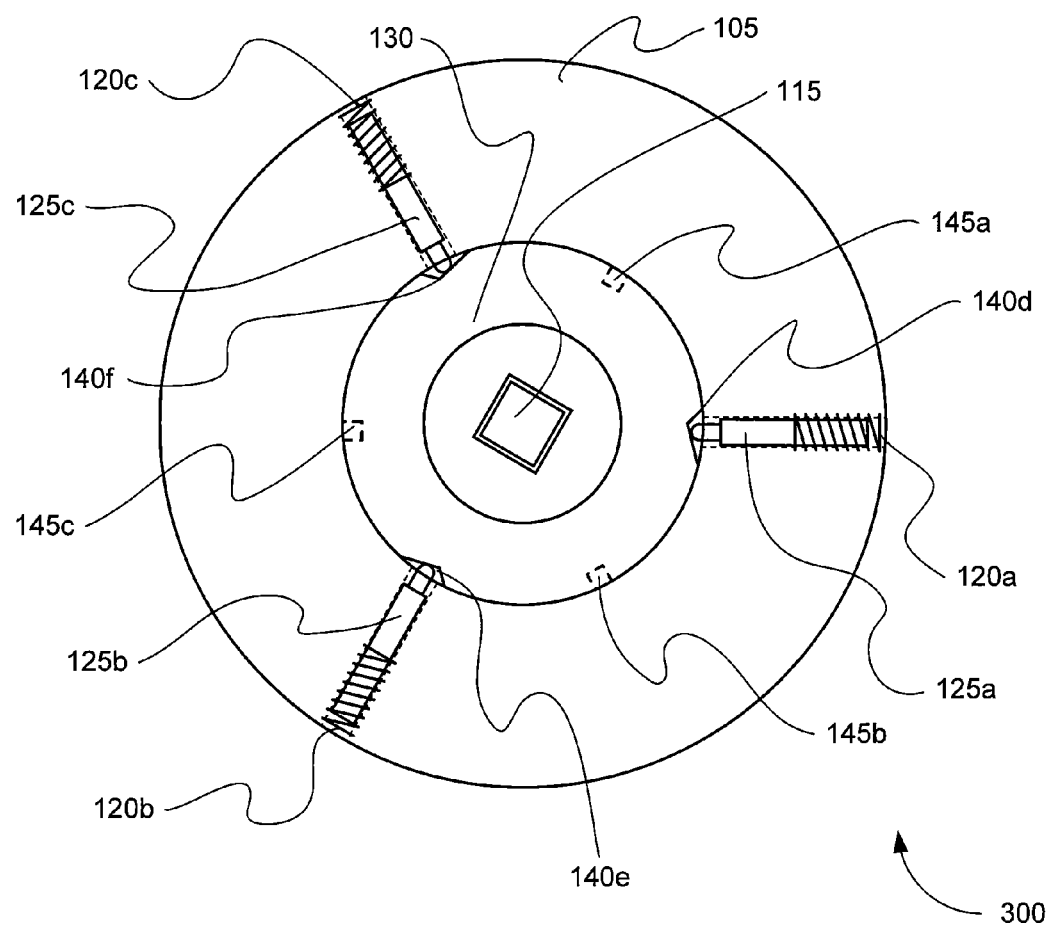
FIG. 3 shows a plan view of the top of another system of the invention.

FIG. 3 shows a plan view of the top of another system 300 of the invention. System 200 is similar to system 100, except that primary cavities 140 have a sloped wall on each side. This allows for maximum torques to be configured for system 200 in both the clockwise and counterclockwise direction. Limiting the maximum torque in the counterclockwise direction may limit the amount of torque that may be applied to the valve once the valve has reached a substantially full-open position. This may inhibit the system from causing damage to the sealing element or open seat position of the valve. The slope of the counterclockwise wall of the primary cavities 140, as well as the force produced by force producing elements 120 may determine the maximum counterclockwise torque which may be applied by system 200. As in the previous system 100, a user may still override the maximum allowable open torque by moving input element 105 laterally relative to drive element 110 and locking force transferring elements 125 into secondary cavities 145.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention.

As used herein and in the appended claims, the singular forms "a", "an", and "the" include plural referents unless the context clearly dictates otherwise. Thus, for example, reference to "a process" includes a plurality of such processes and reference to "the unit" includes reference to one or more units and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A torque limiting shutoff valve for a compressed fluid component, the valve comprising:
   a handle that is turned to open or close the valve when torque is applied, wherein the handle comprises one or more spring loaded pins that are biased to move towards the center of the handle;
   a torque collar in contact with tips of the spring loaded pins, wherein the pin tips are operable to frictionally engage and turn the torque collar in response to the turning of the handle in a first direction, and wherein the pins slip around the collar when the torque applied to the handle in a first direction exceeds a first threshold torque; and
   a valve element positioned through the center of the torque collar and operable to rotate in concert with the collar, wherein the rotation of the valve element actuates the opening or closing of the valve.

2. The torque limiting valve of claim 1, wherein the torque collar has a first set of grooves that are configured to reversibly engage the tips of the spring loaded pins, wherein the pins engage the first set of grooves until the torque applied to the handle exceeds the first threshold torque.

3. The torque limiting valve of claim 1, wherein the torque collar has a second set of grooves in a different rotational plane then the first set of groves, wherein the pins do not engage the second set of grooves until the handle is at least moved parallel to the handle's rotational axis to align the pins with the rotational plane of the second set of grooves.

4. The torque limiting valve of claim 3, wherein the pins engage the second set of grooves until the torque applied to the handle exceeds a second threshold torque, wherein the second threshold torque is different than the first threshold torque.

5. The torque limiting valve of claim 3, wherein the pins engage with the second set of grooves regardless of the torque applied to the handle.

6. The torque limiting valve of claim 3, wherein an indicia on the valve is exposed when the handle is moved parallel to the handle's rotational axis to align the pins with the second set of grooves, the indicia indicating that the pins are aligned with the second set of grooves.

* * * * *